July 11, 1967
V. B. BRIDGES
3,330,175
MOVEABLY SUPPORTED CUT OFF SAW
Filed Sept. 2, 1965
2 Sheets-Sheet 1
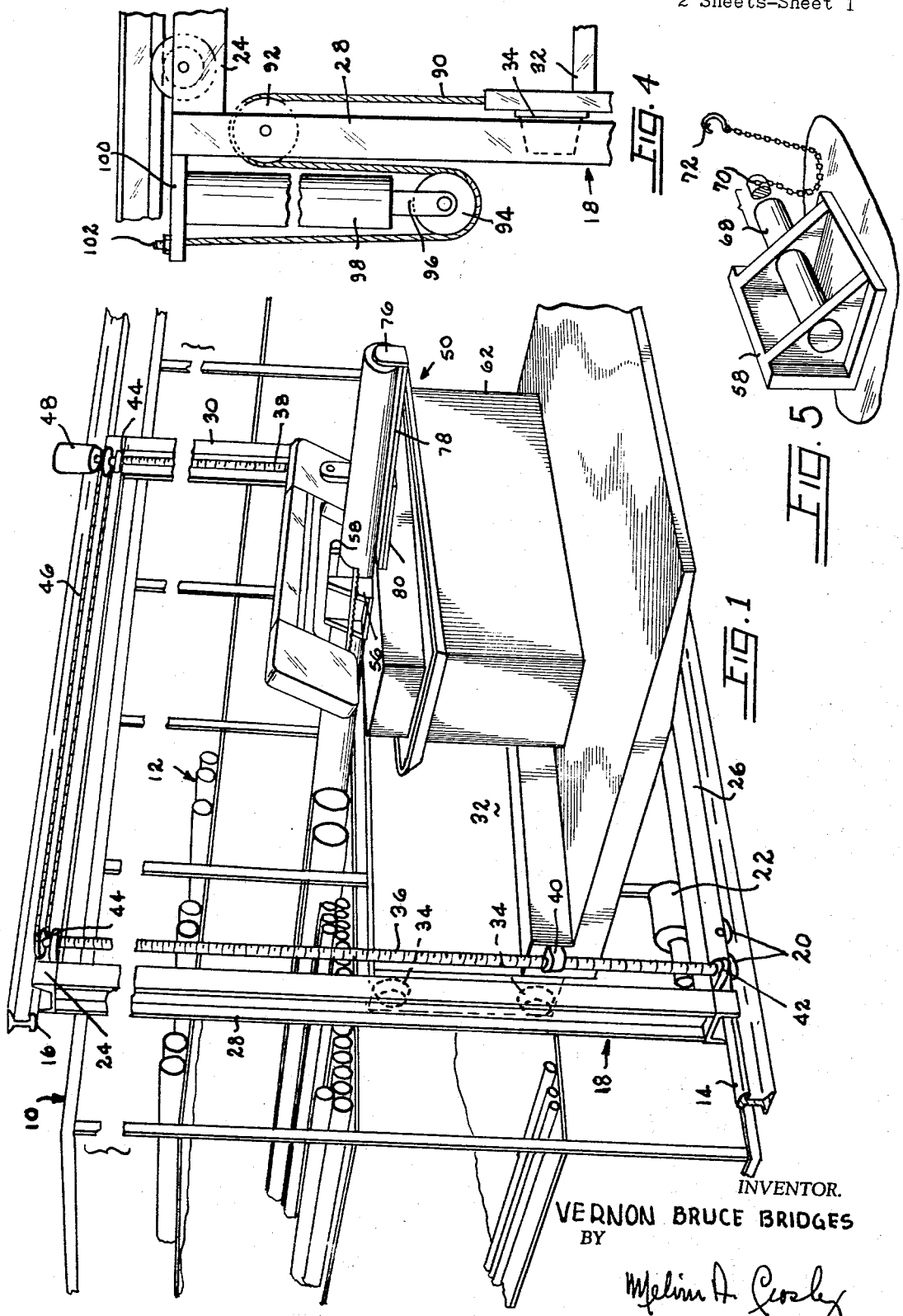
INVENTOR.
VERNON BRUCE BRIDGES
BY July 11, 1967
V. B. BRIDGES
3,330,175
MOVEABLY SUPPORTED CUT OFF SAW
Filed Sept. 2, 1965
2 Sheets-Sheet 2
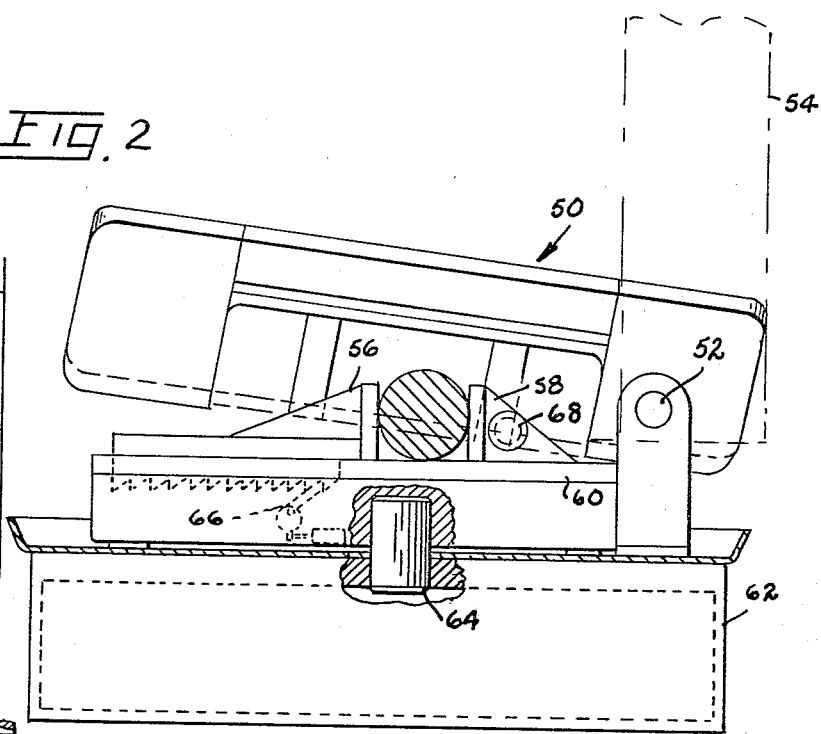
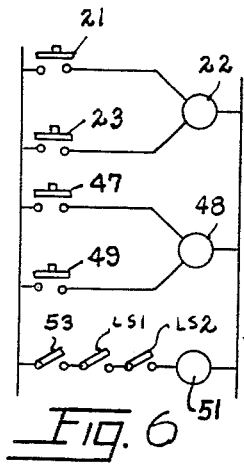
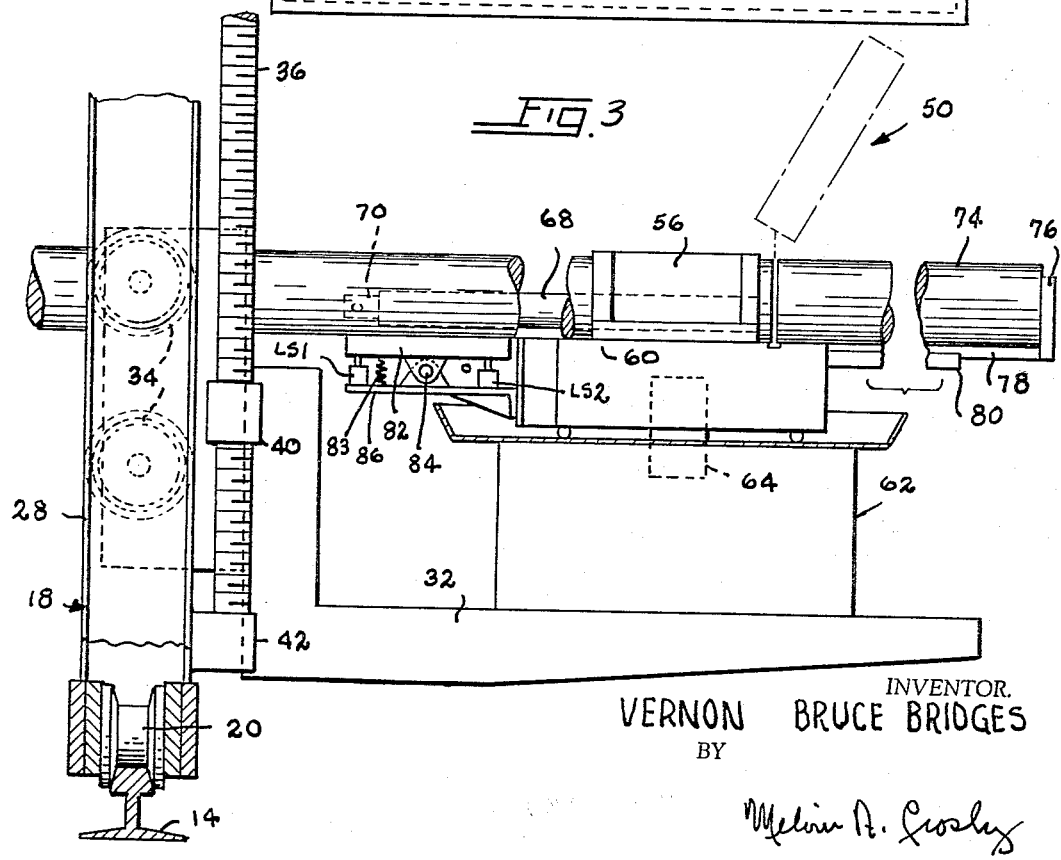
INVENTOR.
VERNON BRUCE BRIDGES
BY
Melvin A. Crosby United States Patent Office 3,330,175
Patented July 11, 1967

3,330,175
MOVEABLY SUPPORTED CUT OFF SAW
Vernon Bruce Bridges, 910 Jefferson St.,
Pitsburg, Ohio 45358
Filed Sept. 2, 1965, Ser. No. 484,650
12 Claims. (Cl. 83—201)

This invention relates to a saw arrangement and is particularly concerned with a saw arrangement which is adapted for being associated with a stock bin and which will cut off lengths of stock in the bin without conveying the stock away from the bin to the saw.

Saws for sawing off metal bar stock and the like are, of course, well known. It is also customary in manufacturing plants where bar and rod stock and rolled sections and the like are used to store the stock in a stock bin and to convey the stock from the bin to a saw from which lengths of the stock are sawed for use. This movement of the stock from the bin to the saw and then back to the bin is, of course, time consuming and creates certain confusion and requires equipment for moving the stock when it is large and heavy and likewise takes up considerable space. In rush periods it is often the case that the stock does not get returned immediately to the stock bin and the stock can thereby accumulate adjacent the saw.

This present invention is concerned with a saw arrangement which is located adjacent one end of a stock bin of the nature referred to and which is movably positioned so that the saw can be brought into substantial alignment with the stock to be cut off, the stock can then be drawn out from the stock bin and the desired length cut off, and the remaining length of stock pushed back into the bin immediately. In this manner there is no conveying of stock away from the stock bin to the saw, and back again, and there is thus no auxiliary equipment needed and the minimum of space is required for the combination of the stock bin and the saw arrangement.

In general, my invention consists in placing support tracks in front of the stock bin and movably mounting a frame on said support tracks for movement therealong and within which frame there is vertically movable a platform on which a saw can be mounted. Inasmuch as the frame is movable laterally along supporting rails and the saw platform is movable vertically in the frame, it will be evident that the saw can be positioned at any desired region in front of the stock bin. The structure is provided with a pulling arrangement for pulling stock out of the bin into the saw and for pushing the stock back into the bin after it is cut off and also includes an arrangement for supporting the cut off piece of stock so that it can be picked up by a conveying device, if so desired, and conveyed from the saw to a point of use.

The nature of the present invention will be more clearly understood upon reference to the following detailed specification taken in connection with the accompanying drawings, in which:

FIGURE 1 is a perspective view showing a stock bin with a saw arrangement and a moveable supporting platform therefor according to the present invention associated therewith;

FIGURE 2 is a view looking in at the saw and showing a swivel arrangement for supporting the saw so that the saw can align with stock being delivered thereto;

FIGURE 3 is a view looking from the left side of FIGURE 2 and showing the stock pulling arrangement and also showing a leveling device by means of which the vertical position of the saw relative to the stock to be cut off can be ascertained;

FIGURE 4 is a fragmentary view showing a modified form of device for raising and lowering the saw platform in its supporting frame;

FIGURE 5 is a schematic perspective view showing how a pulling cylinder can be incorporated in the fixed jaw structure; and FIGURE 6 is a schematic showing of a control circuit for the saw.

Referring to the drawings somewhat more in detail, 10 indicates a stock bin of the usual type which consists of a plurality of spaced upright members and a plurality of spaced horizontal members extending therebetween and forming a rack with shelves which receive lengths of stock generally indicated at 12. The lengths of stock may be of any cross sectional configuration that might be employed in industry and most frequently are lengths of round or hexagonal stock.

Positioned in front of the stock bin is a lower rail 14 and an upper rail 16. These rails may take any structural form but in the drawings are shown as relatively lightweight track sections shaped similarly to railroad tracks.

Movable along these rails is a frame 18. Frame 18 is provided with rollers 20 of a suitable shape engaging the tracks 14 and 16 so that the frame is rollable along the tracks. Advantageously, a motor 22 is provided drivingly connected to one or more of the rollers 20 and in this manner the frame can be power operated in either direction of movement along the supporting rails 14 and 16.

Frame 18 comprises upper and lower horizontal members 24 and 26 extending horizontally adjacent rails 14 and 16. Extending vertically between the members 24 and 26 at the ends thereof are vertical members 28 and 30. These last mentioned structural members may, for example, be I beams or channels or the like. Mounted in the frame is a saw supporting platform 32. Platform 32 carries rollers 34 at opposite sides engaging vertical members 28 and 30 so that the platform is guided for vertical movement in frame 18.

As will be seen in FIGURE 1, vertical screws 36 and 38 may be provided adjacent the end members 28 and 30 and these screws extend through nuts 40 on opposite sides of table 32. The upper and lower ends of the screws are supported by bearings 42 and 44 provided therefor on the frame 18. The upper ends of screws 36 carry sprockets which are interconnected by a chain 46. In this manner the two screws are caused to turn in unison whereby the opposite ends of platform 32 will be moved identical amounts and platform 32 will always remain in parallelism with itself in all adjusted positions thereof. A motor 48 connected to one of the screws is selectively energizable for rotating the screws to raise and lower the platform 32. The screws are self locking and the platform will remain in its adjusted position when the motor is deenergized.

Mounted on platform 32 is a saw structure generally indicated at 50, and which can comprise a substantially conventional type saw including a band saw or a reciprocating type saw. As will be seen in FIGURE 2, the saw structure is preferably pivotally supported at 52 and is adapted for being raised to a substantially vertical position as indicated by the dot dash outline at 54. The provision of the movement of the saw to the substantially vertical position makes it a simple matter to gain access to the clamping jaws 56 and 58 of the saw for inserting and removing stock therefrom.

A feature of the present invention is to be seen in FIGURE 2 wherein the saw bed 60 on which the stock rests while being sawed is supported on a base portion 62 by pivot means 64. The provision of the pivot means permits rotation of the saw bed of the saw so that if the stock is not exactly aligned with the saw bed, when the jaws 56 and 58 are clamped up against the stock the saw bed will turn somewhat and thereby exactly align with the stock and in this manner a square cut across the stock can be taken.

Advantageously, the jaw 58 is fixed and jaw 56 is movable by the hydraulically operated ratchet mechanism generally indicated at 66.

As will be seen in FIGURES 3 and 5, there is included in the saw structure a piston and cylinder means 68, the ram 70 of which carries a gripping device 72 which may be a chain and hook arrangement. The cylinder, as will be seen in FIGURE 5, may be embodied in the fixed jaw structure. The chain and hook arrangement can be replaced by other stock gripping means so that by moving ram 70 into the stock bin, and connecting it to the piece of stock to be sawed, the stock can be pulled out from the bin into sawing position. Obviously, if the stock to be cut off must be moved farther than the stroke of the ram 70, several bites can be taken along the stock and it can gradually be pulled out to working position. After the stock is cut off the same piston and cylinder means can be employed for pushing the stock back into the stock bin.

The pulling cylinder, in being located adjacent the fixed jaw, will pull the stock against the fixed jaw and final clamping of the stock is thus facilitated.

It will also be seen in FIGURE 3 that the length of stock, indicated at 74, is moved out until it abuts the movable stop 76. Stop 76 is carried on a bar 78 that is slidable in a support 80. Stop 76 can thus be pre-set to abut the stock at a desired extension thereof beyond the line of cut of the saw, indicated at 80, and thereby the desired length of stock for being cut off is readily determined. Also, the stop 76, the rod 78 and guide 80, form a support for the cut off piece of stock so it will be supported until a conveying device grips the stock and lifts it from the saw and conveys it to a point of use.

The saw structure of the present invention furthermore comprise a tiltable platform 82, pivoted at 84 to a stationary support bracket 86. A spring 83 biases the platform toward a tilted position. A pair of limit switches LS1 and LS2 are associated with tiltable platform 82 and are adapted for actuation into open position thereby when the platform tilts in either direction from the horizontal position. By the provision of platform 82, the correct vertical position of the sawing table can readily be determined and unless the platform 82 is held horizontally, the saw cannot be operated. Thus with the provision of the tiltable table 82 to determine when the stock can be cut off is horizontal and the provision of the pivot 64 to square the saw with the length of the stock, perfectly square cuts can always be taken on a length of stock.

The limit switches LS1 and LS2 are both closed only when platform 82 is held level by a piece of stock. The limit switches are employed in a control circuit such as the one shown in FIGURE 6.

In FIGURE 6, switches 47 and 49 control the up and down movement of the saw platform by reversibly controlling motor 48.

Similarly switches 21 and 23 control movement of carriage or frame 18 by reversibly controlling motor 22.

Saw motor 51 is under the control of on-off switch 53 which is effective only when both of limit switches LS1 and LS2 are closed.

The screws 36 and 38 illustrated in FIGURES 1 and 3 can be replaced by a hydraulic device for raising and lowering the platform if so desired. One example of such a device is shown in FIGURE 4 wherein there is connected to platform 32 a lift cable 90. There would be one of the lift cables at each side of the platform and each cable runs over an idler pulley 92 in the adjacent side frame member of the support frame for platform 32. The cable then passes around a pulley 94 on the end of a ram 96 that extends into a cylinder 98 and which cylinder is carried on the support frame as by the bracket 100. The extreme end of cable 90 is anchored at 102 to bracket 100.

It will be evident that movement of ram 96 into and out of its cylinder 98 will be accompanied by vertical movement of the saw platform 32 in its supporting frame 18. Suitable hydraulic means can be provided for sychronizing the operation of the fluid motors at opposite ends of the saw platform supporting frame, or other means could be provided for maintaining the saw platform in parallelism with itself at all times.

From the foregoing, it will be appreciated that the present invention consists of the provision of a saw supporting platform, a frame in which the saw supporting platform is vertically movable, rails supporting the frame for horizontal movement adjacent a stock bin, power means for moving the frame and for moving the platform in the frame, and means pertaining to the saw structure for insuring that the stock will be properly squared therein at the time of sawing. Together with the foregoing devices, is provided power means for pulling stock from the stock bin into the saw and for pushing the stock from the saw back into the stock bin together with an adjustable stop and a support for supporting the cut off piece of stock until it can be moved away from the saw.

It will be understood that the present invention is adapted to be modified to meet varying situations and conditions of usage and it is intended that any such modifications are to be included within the present invention that fall within the scope of the appended claims.

I claim:

1. In combination, for use in connection with a stock bin; upper and lower horizontally extending rails adapted for being arranged at one end of a stock bin, a frame supported on said rails for movement thereon, a platform supported by said frame for vertical movement therein and adapted for receiving a motor driven saw structure for sawing stock drawn from said bin into the saw, and power means for moving said frame along said rails and for moving said platform in said frame, said platform including means supporting said saw for pivotal movement about a vertical axis whereby the saw can align itself in a horizontal plane with stock drawn from the bin and clamped in the saw for a sawing operation, said platform also comprising a tiltable platform which engages beneath stock extending into the saw and which is operable for detecting misalignment in a vertical plane of the table of the saw with the stock to be sawed, means biasing said platform toward a tilted position so that platform is level only when stock is resting thereon in a position of alignment with said saw structure in a vertical plane, and limit switch means adjacent said platform for actuation by said platform upon tilting thereof, said limit switch means being adapted for connection in circuit with the drive motor of the saw structure and operable to permit energization of said drive motor only when said platform is level.

2. In combination, for use in connection with a stock bin; upper and lower horizontally extending rails adapted for being arranged at one end of a stock bin, a frame supported on said rails for movement thereon, a platform supported by said frame for vertical movement therein and adapted for receiving a motor driven saw structure for sawing stock drawn from said bin into the saw, and power means for moving said frame along said rails and for moving said platform in said frame, said platform including means supporting said saw for pivotal movement about a vertical axis whereby the saw can align itself in a horizontal plane with stock drawn from the bin and clamped in the saw for a sawing operation, said platform also comprising a tiltable platform which engages beneath stock extending into the saw and which is operable for detecting horizontal misalignment in a vertical plane of the table of the saw with the stock to be sawed, and limit switch means adjacent said platform adapted for actuation thereby in response to tilting movements of said platform and adapted for being connected in controlling relation to the saw drive motor to prevent energization thereof except when said platform is held level by stock resting thereon.

3. In combination, for use in connection with a stock bin; upper and lower horizontally extending rails adapted for being arranged at one end of a stock bin, a frame supported on said rails for movement thereon, a platform supported by said frame for vertical movement therein and adapted for receiving a saw structure for sawing stock drawn from said bin into the saw, and power means for moving said frame along said rails and for moving said platform in said frame, said platform including means supporting said saw for pivotal movement about a vertical axis whereby the saw can align itself with stock drawn from the bin and clamped in the saw for a sawing operation, said platform also comprising a tiltable platform which engages beneath stock extending into the saw and which is operable for detecting horizontal misalignment of the table of the saw with the stock to be sawed, and limit switch means adjacent said platform adapted for actuation thereby in response to tilting movements of said platform, a saw on the platform having a drive motor, and an energizing circuit for the motor, said limit switch means being connected in said circuit to prevent operation of the saw motor except when said platform is level.

4. In combination, for use in connection with a stock bin; upper and lower horizontally extending rails adapted for being arranged at one end of a stock bin, a frame supported on said rails for movement thereon, a platform supported by said frame for vertical movement therein and adapted for receiving a saw structure for sawing stock drawn from said bin into the saw, and power means for moving said frame along said rails and for moving said platform in said frame, said platform including means supporting said saw for pivotal movement about a vertical axis whereby the saw can align itself with stock drawn from the bin and clamped in the saw for a sawing operation, said platform also comprising a tiltable platform which engages beneath stock extending into the saw and which is operable for detecting horizontal misalignment of the table of the saw with the stock to be sawed, and limit switch means adjacent said platform adapted for actuation thereby in response to tilting movements of said platform, a saw on the platform having a drive motor, an energizing circuit for the motor, said limit switch means being connected in said circuit to prevent operation of the saw motor except when said platform is level, and stock feed means carried by said saw structure for engaging stock in said stock bin and operable for pulling the stock therefrom to the saw and for pushing the stock from the saw back into the bin.

5. In combination, for use in connection with a stock bin; upper and lower horizontally extending rails adapted for being arranged at one end of a stock bin, a frame supported on said rails for movement thereon, a platform supported by said frame for vertical movement therein and adapted for receiving a saw structure for sawing stock drawn from said bin into the saw, and power means for moving said frame along said rails and for moving said platform in said frame, said platform including means supporting said saw for pivotal movement about a vertical axis whereby the saw can align itself with stock drawn from the bin and clamped in the saw for a sawing operation, said platform also comprising a tiltable platform which engages beneath stock extending into the saw and which is operable for detecting horizontal misalignment of the table of the saw with the stock to be sawed, and limit switch means adjacent said platform adapted for actuation thereby in response to tilting movements of said platform, a saw on the platform having a drive motor, an energizing circuit for the motor, said limit switch means being connected in said circuit to prevent operation of the saw motor except when said platform is level, and stock feed means carried by said saw structure for engaging stock in said stock bin and operable for pulling the stock therefrom to the saw and for pushing the stock from the saw back into the bin, said stock feed means comprising a cylinder integral with the saw structure and a ram reciprocable therein and carrying gripping means for engagement with stock to be fed to and from the stock bin.

6. In combination, for use in connection with a stock bin; upper and lower horizontally extending rails adapted for being arranged at one end of a stock bin, a frame supported on said rails for movement thereon, a platform supported by said frame for vertical movement therein and adapted for receiving a saw structure for sawing stock drawn from said bin into the saw, and power means for moving said frame along said rails and for moving said platform in said frame, said platform including means supporting said saw for pivotal movement about a vertical axis whereby the saw can align itself with stock drawn from the bin and clamped in the saw for a sawing operation, said platform also comprising a tiltable platform which engages beneath stock extending into the saw and which is operable for detecting horizontal misalignment of the table of the saw with the stock to be sawed, and limit switch means adjacent said platform adapted for actuation thereby in response to tilting movements of said platform, a saw on the platform having a drive motor, an energizing circuit for the motor, said limit switch means being connected in said circuit to prevent operation of the saw motor except when said platform is level, said saw structure comprising a fixed and a movable jaw, a cylinder formed in said fixed jaw, a ram reciprocable in said cylinder in a direction parallel to the direction in which stock extends through the saw, and stock gripping means on the outer end of said ram.

7. In combination, for use in connection with a stock bin; upper and lower horizontally extending rails adapted for being arranged at one end of a stock bin, a frame supported on said rails for movement thereon, a platform supported by said frame for vertical movement therein and adapted for receiving a saw structure for sawing stock drawn from said bin into the saw, and power means for moving said frame along said rails and for moving said platform in said frame, said power means including motor driven support roller means supporting said frame on said rails, and vertical motor driven screw means in the frame connected to said platform.

8. In combination, for use in connection with a stock bin; upper and lower horizontally extending rails adapted for being arranged at one end of a stock bin, a frame supported on said rails for movement thereon, a platform supported by said frame for vertical movement therein and adapted for receiving a saw structure for sawing stock drawn from said bin into the saw, and power means for moving said frame along said rails and for moving said platform in said frame, said power means including motor driven support roller means supporting said frame on said rails, and fluid motor operated lift cables in the frame connected to said platform.

9. In combination, for use with a stock bin having an open end and adapted for having lengths of rod and bar stock and the like stored therein; upper and lower supporting rails adapted for arrangement at the open end of said bin respectively located above and below the level of stock in the bin and in a plane substantially normal to the length of stock stored in said bin, and open frame comprising upper and lower and laterally spaced side members, said open frame being moveably supported on said rails for movement thereon laterally of the open end of said bin, a platform mounted in the frame for movement in the frame vertically at the open end of said bin, and a saw structure on said platform for sawing off stock drawn from said bin through said frame and into said saw, said saw structure having means for clamping stock therein drawn out from the open end of said bin and means for sawing off the stock in a direction substantially normal to the length of said stock.

10. The combination according to claim 9 which includes power means for moving at least said platform in said frame.

11. The combination according to claim 10 which also includes power means for moving said frame along said rails.

12. The combination according to claim 11 in which said platform includes means supporting said saw for pivotal movement about a vertical axis on said platform whereby the saw can align itself in a horizontal plane with a stock drawn from the bin and clamped in the saw for a sawing operation.

References Cited
UNITED STATES PATENTS 3,122,183   2/1964   Striebig _____ 143—47

FOREIGN PATENTS 1,146,645   4/1965   Germany.

ANDREW R. JUHASZ, *Primary Examiner*.